United States Patent
Chang et al.

(10) Patent No.: US 8,557,890 B2
(45) Date of Patent: Oct. 15, 2013

(54) COATING COMPOSITION AND COATING FILM HAVING ENHANCED ABRASION RESISTANCE AND FINGERPRINT TRACES REMOVABILITY

(75) Inventors: Yeong-Rae Chang, Daejeon (KR);
Joon-Koo Kang, Daejeon (KR);
Kyung-Ki Hong, Chungcheongbuk-do (KR); Eun-Sang Yoo, Chungcheongbuk-do (KR); Sung-Su Kim, Chungcheongbuk-do (KR);
Ju-Young Kim, Daejeon (KR);
Soon-Hwa Jung, Daejeon (KR);
Young-Jun Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/745,061

(22) PCT Filed: Nov. 28, 2008

(86) PCT No.: PCT/KR2008/007060
§ 371 (c)(1),
(2), (4) Date: May 27, 2010

(87) PCT Pub. No.: WO2009/069974
PCT Pub. Date: Jun. 4, 2009

(65) Prior Publication Data
US 2010/0304113 A1 Dec. 2, 2010

(30) Foreign Application Priority Data
Nov. 29, 2007 (KR) .......................... 10-2007-0122640

(51) Int. Cl.
*C08F 2/50* (2006.01)
*C08J 3/28* (2006.01)
*B32B 27/06* (2006.01)
*B32B 27/20* (2006.01)
*B32B 27/26* (2006.01)
*B32B 27/30* (2006.01)

(52) U.S. Cl.
USPC ................. 522/124; 522/71; 522/74; 522/81; 522/83; 522/90; 522/96; 522/100; 522/103; 522/113; 522/114; 522/116; 522/117; 522/120; 522/121; 522/129; 522/131; 428/1.6; 428/1.1; 428/411.1; 428/421

(58) Field of Classification Search
USPC ............. 522/71, 74, 77, 81, 83, 96, 100, 103, 522/90, 113, 114, 124, 120, 129, 130, 131; 428/1.6, 1.1, 411.1, 421
See application file for complete search history.

(56) References Cited

U.S. PATENT DOCUMENTS

| | | | |
|---|---|---|---|
| 2005/0053790 A1 | 3/2005 | Kato | |
| 2005/0158504 A1 | 7/2005 | Itoh et al. | |
| 2010/0189970 A1 | 7/2010 | Pokorny et al. | |

FOREIGN PATENT DOCUMENTS

| CN | 001898342 A | 1/2007 |
|---|---|---|
| JP | 07-16940 A | 1/1995 |
| JP | 2004-258348 A | 9/2004 |
| JP | 2004 258348 A | 9/2004 |
| JP | 2005-076006 A | 3/2005 |
| JP | 2005-179613 | 7/2005 |
| JP | 2005-179613 A | 7/2005 |
| JP | 2007-145965 A | 6/2007 |
| KR | 10-2006-0009194 A | 1/2006 |
| WO | WO 02/28659 A2 | 4/2002 |
| WO | WO 03/022935 A1 | 3/2003 |
| WO | WO 03/086959 A2 | 10/2003 |
| WO | WO 2004/104116 A1 | 12/2004 |
| WO | WO 2007/102370 A1 | 9/2007 |
| WO | WO 2007/121091 A2 | 10/2007 |
| WO | WO 2009/035874 A1 | 3/2009 |

OTHER PUBLICATIONS

Office Action of Taiwanese Patent Office in Application No. 97146594, dated Apr. 11, 2013.

*Primary Examiner* — Sanza McClendon
(74) *Attorney, Agent, or Firm* — McKenna Long & Aldridge LLP

(57) ABSTRACT

The present invention provides a coating composition and a coating film that comprises a binder containing a UV-curable functional group, a compound containing a fluorine UV-curable functional group, a photoinitiator; and nano-sized particles. The coating film according to the present invention has excellent abrasion resistance and contamination resistance such as fingerprint trace removability and scribbling resistance.

16 Claims, No Drawings

COATING COMPOSITION AND COATING FILM HAVING ENHANCED ABRASION RESISTANCE AND FINGERPRINT TRACES REMOVABILITY

This application is a 35 U.S.C. §371 National Stage entry of International Application No. PCT/KR2008/007060, filed on Nov. 28, 2008, and claims priority to Korean Application No. 10-2007-0122640, filed on Nov. 9, 2007, which are all hereby incorporated by reference in their entireties.

TECHNICAL FIELD

The present invent ion relates to a coating composition and a coating film. More particularly, the present invention relates to a coating composition and a coating film that are capable of being applied to displays such as TVs, notebook computers, mobile phones and the like, have excellent abrasion resistance, and are capable of easily removing contaminants of oil components such as fingerprints or scribbles.

This application claims priority from Korean Patent Application No. 2007-0122640 filed on Nov. 29, 2007 in the Korean Intellectual Property Office, the disclosure of which is incorporated herein by reference in its entirety.

BACKGROUND ART

In the case of various displays, there are problems in that an image is easily deformed or the quality of appearance is reduced by fingerprints. In addition, in the case of when a known general surface treating agent is used, contamination such as fingerprints are not easily removed and spread, thus increasing problems.

In the related art, some methods for realizing the surface treatment to provide the abrasion resistance and the contamination resistance have been suggested.

As a first method, there is a method for introducing a hydrophobic fluorine or silicon surfactant to an abrasion resistant coating solution, and in this method, after the coating and the curing, since the hydrophobic surfactant is disposed on the surface of the film, contamination resistance is provided to the film. In this case, since the hydrophobic surfactant is not bonded to a binder of a coating layer, if contamination resistance is measured after its surface is rubbed by using a piece of cloth several hundreds times, there is a disadvantage in that the property is rapidly reduced. In addition, in order to ensure the desired contamination resistance property, an excessive amount of surfactant should be added, and in this case, there is a disadvantage in that the abrasion resistance is reduced.

As a second method, there is a method in which a coating layer is separately formed to provide the contamination resistance onto an abrasion resistant coating layer by using a twice coating method. Japanese Unexamined Patent Application Publication No. 07-16940 discloses that a copolymer of acrylate and silica, which has a perfluoro group, is separately coated on a low reflective layer that is made of silica as a main component. This method is characterized in that the contamination resistance property is maintained while the surface of the film is rubbed, but in order to ensure this, a bonding group should be present to react with a material of the contamination resistant layer in the abrasion resistant coating layer, and there is a problem in that a production cost is increased because it is produced by using the twice coating method. In addition, in the case of when oil components such as fingerprints are continuously adhered, since oils penetrate a film, there is a problem in that properties of the film are rapidly reduced.

DISCLOSURE

Technical Problem

In order to solve the above problems of the prior arts, it is an object of the present invention to provide a coating composition and a coating film that are capable of simultaneously providing abrasion resistance and contamination resistance by using a one-time coating method, maintaining properties of abrasion resistance and contamination resistance while a film is rubbed, and reducing and easily removing contamination by an oil component such as fingerprints.

Technical Solution

In order to accomplish the above object, the present invention provides a coating composition that comprises a binder containing a UV-curable functional group, a compound containing a fluorine UV-curable functional group, a photoinitiator, and nano-sized particles.

In addition, the present invention provides a coating film that comprises a binder containing a UV-curable functional group, a compound containing a fluorine UV-curable functional group, a photoinitiator, and nano-sized particles.

In addition, the present invention provides a method for producing a coating film, wherein the method comprises the steps of: coating the coating composition that comprises a binder containing a UV-curable functional group, a compound containing a fluorine UV-curable functional group, a photoinitiator, and nano-sized particles on a substrate; drying the coated coating composition; and photocuring the coated coating composition.

In addition, the present invention provides a display device that includes the coating film.

Advantageous Effects

In the case of when a film is formed by using the coating composition according to the present invention, abrasion resistance and contamination resistance are capable of being simultaneously provided by using a one-time coating method, properties of abrasion resistance and contamination resistance are capable of being maintained while a film is rubbed, and contamination by an oil component such as fingerprints is capable of being reduced and easily removed.

BEST MODE

A coating composition according to the present invention includes a binder containing a UV-curable functional group, a compound containing a fluorine UV-curable functional group, a photoinitiator, and nano-sized particles.

The binder containing a UV-curable functional group is a main component that is capable of providing the abrasion resistance to a coating film, and the compound containing a fluorine UV-curable functional group is a component that is useful to reduce and remove contamination by oil components such as fingerprints. In addition, the nano-sized particles may provide the scribbling resistance to the film while they are mixed with other components of the coating composition according to the present invention.

In the present invention, as a binder having the UV-curable functional group, multi-functional or mono-functional monomers or oligomers are included. It is required that the binder has the high crosslinking density in order to improve the abrasion resistance, but since cracks or wrong attachment due to the curing shrinkage of the coating film may occur, it is necessary to control the density of the binder.

The functional group that may be included in the binder is not particularly limited as long as the functional group is UV-curable, and specific examples thereof may include acrylates, methacrylates, vinyls and the like.

Examples of the acrylates include dipentaerythritol hexaacrylate, pentaerythritol tetraacrylate, pentaerythritol triacrylate, trimethylenepropyl triacrylate, ethyleneglycol diacrylate, hexanediol diacrylate, ethyl acrylate, ethylhexyl acrylate, butyl acrylate, hydroxyethyl acrylate and the like.

Examples of the useful acrylate oligomer include a urethane denatured acrylate oligomer, an epoxy acrylate oligomer, an ether acrylate oligomer and the like, and it is preferable that the number of the acrylate functional group is 2~6. In connection with this, it is preferable that the molecular weight of the oligomer is in the range of 1,000~10,000.

In addition, examples of the methacrylates include trimethylolpropane trimethacrylate, ethyleneglycol dimethacrylate, butanediol dimethacrylate, hexaethyl methacrylate, butyl methacrylate and the like, and a methacrylate oligomer may be used.

Examples of the vinyls include divinyl benzene, styrene, paramethylstyrene and the like.

In the present invention, the compound containing a fluorine UV-curable functional group should include fluorine in order to reduce and remove contamination by oil components such as fingerprints. In addition, it is not particularly limited thereto as long as it has a UV-curable functional group.

In detail, acrylate, methacrylate, and vinyls which include a perfluoro group may be used. In connection with this, it is preferable that the compound containing a fluorine UV-curable functional group has 1 to 6 UV-curable functional groups. In detail, the compound containing a fluorine UV-curable functional group may be selected from the group consisting of the compounds that are represented by the following Formulas 1 to 9, but the scope of the present invention is not limited thereto. If it is a material that has a UV-curable functional group and a fluorine group, it may be used.

[Formula 1]

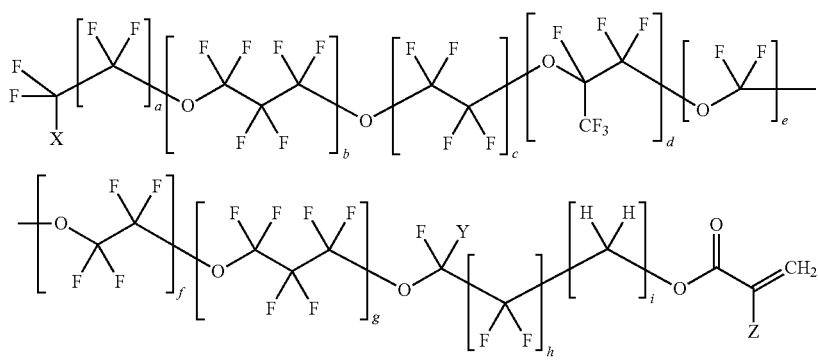

[Formula 2]

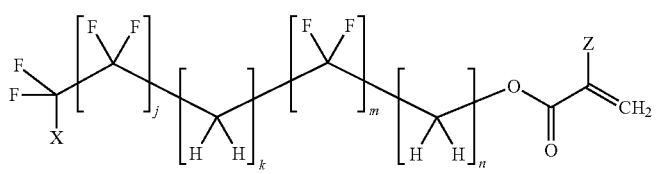

[Formula 3]

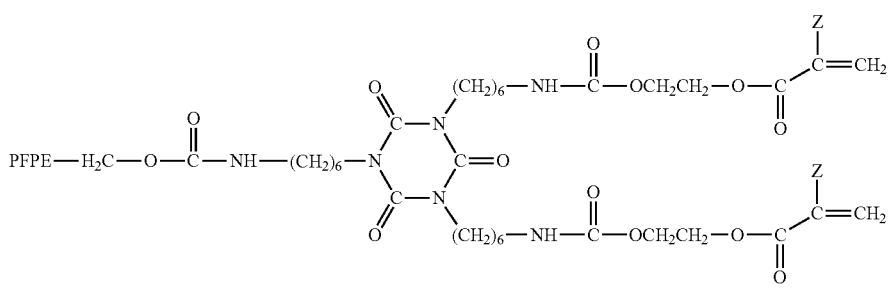

[Formula 4]

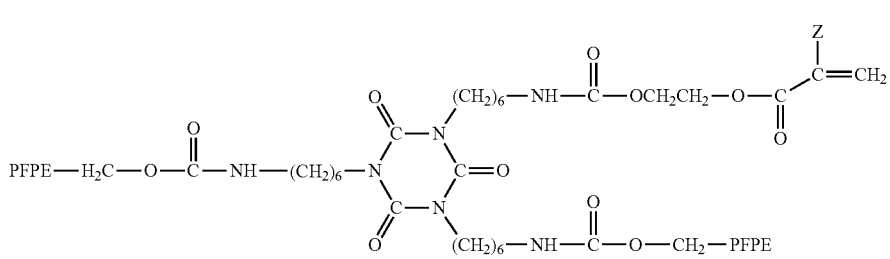

-continued
[Formula 5]
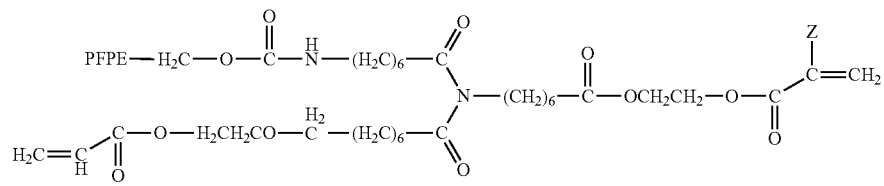
[Formula 6]
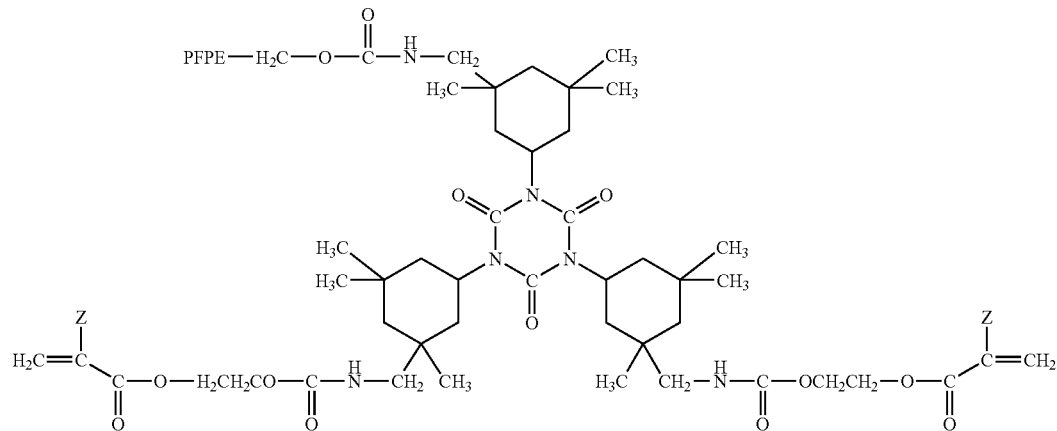
[Formula 7]
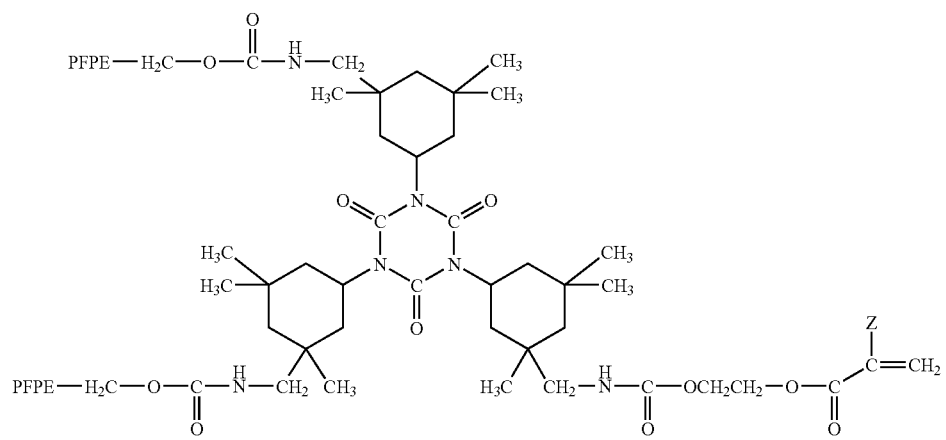
[Formula 8]
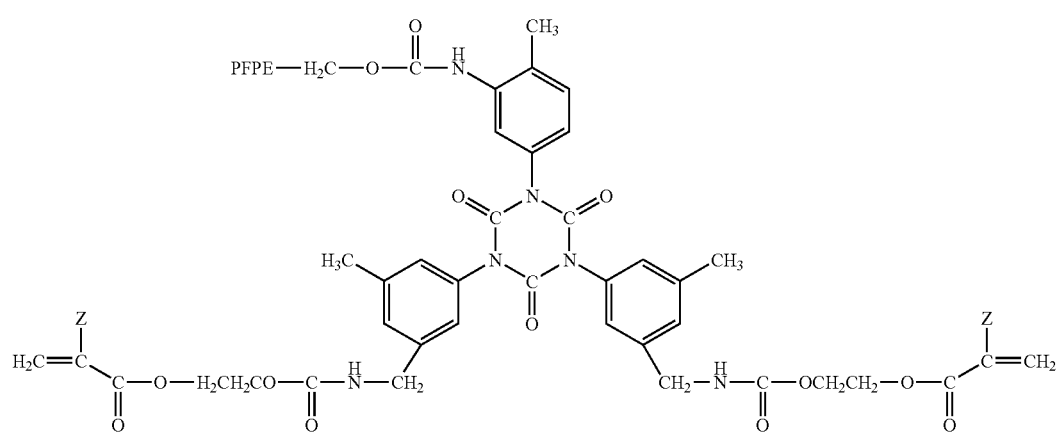

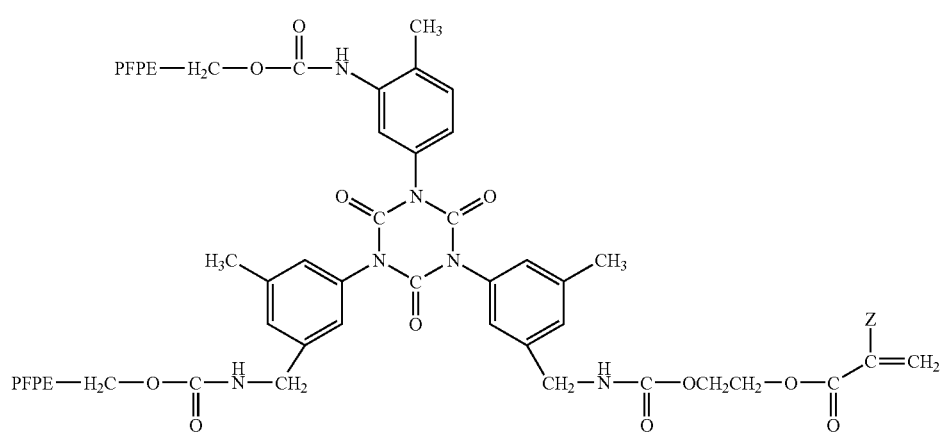
[Formula 9]

In the above Formulas 1 to 9, X and Y are each independently F or $CF_3$, Z is H or $CH_3$, a, j and m are each an integer in the range of 1 to 16, c, k and n are each an integer in the range of 0 to 5, b, d, e, f and g are each an integer in the range of 0 to 200, h and i are each an integer in the range of 0 to 16, and PFPE has the following structure.

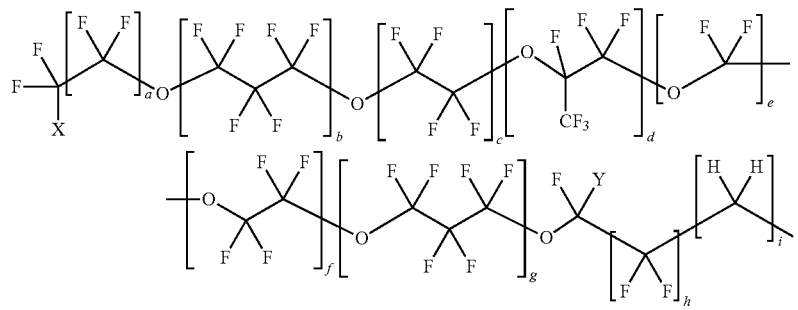

It is preferable that the content of the compound containing a fluorine UV-curable functional group is in the range of 0.5~20 parts by weight on the basis of 100 parts by weight of the binder containing a UV-curable functional group.

In the present invention, it is preferable that the nano-sized particles are optically transparent, and in order to ensure the optical transparency, the average particle diameter is preferably in the range of 0.5~50 nm and more preferably in the range of 5~30 nm. If the particle diameter is too high, an optically opaque coating film is obtained. If the particle diameter is too low, there is a problem in that the scribbling resistance is reduced. Examples of the material of the nano-sized particles may include materials such as silica, alumina, titania, zirconia, magnesium fluoride and the like. In addition, in order to improve the compatibility with the binder and the dispersibility of the particles, the nano-sized particles may be subjected to the surface treatment. In the surface treatment, a silane coupling agent, an epoxy compound, a hydroxyl group-containing compound, an isocyanate compound and other dispersing agents may be used.

It is preferable that the content of the nano-sized particles is in the range of 0.5~50 parts by weight on the basis of 100 parts by weight of the binder containing a UV-curable functional group.

The photoinitiator is not particularly limited as long as it is an initiator that is capable of being decomposed by ultraviolet rays. Detailed examples thereof may include Irgacure 127, Irgacure 184, Darocure 1173, and Irgacure 2959 of alpha-hydroxyketones, Irgacure 369, Irgacure 379, Irgacure 907, and Irgacure 1300 of alpha-aminoketones, Irgacure 651 that is benzyl dimethylketal, Darocure TPO that is monoacylphosphine and the like may be used. It is preferable that the content of the photoinitiator is in the range of 1~20 parts by weight on the basis of 100 parts by weight of the binder containing a UV-curable functional group.

The coating composition according to the present invention may further include a solvent for a coating property in addition to the above components. The kind and the content of the solvent are not particularly limited. Alcohols, alkanes, ethers, cycloalkanes, aromatic organic solvents or the like may be used. In detail, methanol, ethanol, isopropyl alcohol, butanol, ethylene glycol, diacetone alcohol, 2-ethoxy ethanol, 2-methoxy ethanol, 2-butoxy ethanol, propyleneglycol monomethyl ether, hexane, heptane, cyclohexane, acetyl acetone, dimethyl ketone, methyl ethyl ketone, methyl isobutyl ketone, toluene, benzene, xylene, methyl acetate, ethyl acetate, butyl acetate, dimethyl formamide, tetrahydrofurane and the like may be applied, but the scope of the present invention is not limited thereto.

The coating composition according to the present invention may be coated on the substrate. The substrate is not particularly limited, but a plastic film may be used. Examples of the plastic film may include a film including a material that is selected from the group consisting of polyester, triacetyl cellulose, an olefin copolymer and polymethyl methacrylate.

The coating composition may be coated on a substrate by using a coating method that is generally known in the art, and examples of the type of the coating method include two-roll or three-roll reverse coating, gravure coating, micro gravure coating, die coating, curtain coating, bar coating, dip coating, and flow coating and the like.

It is preferable that the film coated by using the above method is cured by irradiation of ultraviolet rays in an amount in the range of 0.05~2 J/cm² after the drying, and particularly, in the case of when it is cured under a nitrogen atmosphere, since the degree of surface curing is increased, the fingerprint removability may be improved.

The coating thickness of the coating composition is in the range of preferably 0.5~300 μm and more preferably 10~30 μm. When the coating thickness is increased, the abrasion resistance is improved, but a winding phenomenon of the film or cracks may occur due to the curing shrinkage.

The coating film that is formed by using the above coating composition has excellent abrasion resistance and contamination resistance such as fingerprint trace removability and scribbling resistance. The thickness of the coating film according to the present invention is in the range of preferably 0.5~300 μm and more preferably 10~30 μm.

The coating film according to the present invention may be applied without being limited as long as it is used for the abrasion resistance and the contamination resistance. For example, it may be applied to display devices. The coating film may be directly coated on parts of the object devices such as display devices to be formed, or may be applied to the object devices in conjunction with the substrate after it is formed on the substrate. The coating film according to the present invention may be applied to a liquid crystal display, an organic light emitting display (OLED), a plasma display and a mobile phone window, but the scope of the present invention is not limited thereto.

MODE FOR INVENTION

A better understanding of the present invention may be obtained in light of the following Examples which are set forth to illustrate, but are not to be construed to limit the present invention.

In the present Example, as described below, after the coating composition and the coating film were produced, physical properties of the abrasion resistance, the fingerprint trace removability and the scribbling resistance were evaluated by using the following method.

The abrasion resistance of the coating film was evaluated at a load of 500 g by hardness of a pencil.

The fingerprint trace removability of the coating film was evaluated by using the following method. The artificial fingerprint solution was produced and applied to a rubber stamp. Next, the rubber stamp was pressed on the surface of the coating film and dried for 10 min. Next, the fingerprint was removed from the coating film by using a gauze towel and the remaining fingerprint was evaluated by the naked eye. At this time, the used artificial fingerprint solution was prepared by JIS K 2246.

In respects to the scribbling resistance of the coating film, the pen mark was examined by the naked eye after two 5 cm lines were drawn by using the oily pen and wiped using the very fine fiber dustless cloth. This was repeated until the pen mark was observed, and the number of repetition was recorded.

Example 1

100 g of EB1290 (Cytec, Co., Ltd.) that was urethane acrylate as the binder containing the UV-curable functional group, 5 g of the material that had the structure of Formula 1 (X and Y are each F, Z is $CH_3$, a, e and i are each 2, b, c, d, f and g are each 1, and h is 3) as the acrylate containing the perfluoro group, 5 g of the photoinitiator Irgacure 184, 10 g of the silica particles that were subjected to surface treatment by using methacryloxy propyltrimethoxy silane and had the average particle diameter of 20 nm, 100 g of methyl ethyl ketone, and 100 g of butyl acetate were mixed with each other, and the coating composition was agitated for about 1 hour so that they were sufficiently mixed with each other. The coating composition that was produced by using the above method was subjected to 2-roll reverse coating so that the curing thickness was 10 μm on the triacetylcellulose film. The coated film was dried at 60° C. in an oven for 2 min, and UV energy was irradiated thereon in the intensity of 1 J/cm² by using the polymerization mercury lamp to produce the abrasion resistant coating film that had the fingerprint trace removability.

Example 2

The coating film was produced by using the same method as Example 1, except that 5 g of the material having the structure of Formula 2 (X is F, Z is $CH_3$, j is 4, and k and n are each 2, and m is 3) was used instead of the material having the structure of Formula 1 as acrylate containing the perfluoro group.

Example 3

The coating film was produced by using the same method as Example 1, except that 5 g of Optool DAC (DAIKIN, Co., Ltd.) having the structure of Formula 3 was used instead of the material having the structure of Formula 1 as acrylate containing the perfluoro group.

Example 4

The coating film was produced by using the same method as Example 1, except that 5 g of the material having the structure of Formula 4 (in Formula 4, Z is $CH_3$, X and Y of PFPE are each F, a, e and i are each 2, b, c, d, f and g are each 1, and h is 3) was used instead of the material having the structure of Formula 1 as acrylate containing the perfluoro group.

Example 5

The coating film was produced by using the same method as Example 1, except that 5 g of the material having the structure of Formula 9 (in Formula 9, Z is $CH_3$, X and Y of PFPE are each F, a, e and i are each 2, b, c, d, f and g are each 1, and h is 3) was used instead of the material having the structure of Formula 1 as acrylate containing the perfluoro group.

Example 6

The coating film was produced by using the same method as Example 3, except that 10 g of the silica particles having the average particle diameter of 14 nm was used instead of the silica particles that had the average particle diameter of 20 nm and were subjected to the surface treatment as the nano-sized particles and 100 g of methanol was used instead of butyl acetate as the solvent.

Example 7

The coating film was produced by using the same method as Example 3, except that magnesium fluoride particles having the average particle diameter of 10 nm were used instead of the silica particles that had the average particle diameter of 20 nm and were subjected to the surface treatment as the nano-sized particles.

Comparative Example 1

The coating film was produced by using the same method as Example 3, except that acrylate containing the perfluoro group was not used.

Comparative Example 2

The coating film was produced by using the same method as Example 3, except that the silica particles that were subjected to the surface treatment were not used.

The pencil hardness, the fingerprint trace removability, and the scribbling resistance of the coating film that was produced by using the above method were evaluated. The evaluated results are described in the following Table 1.

TABLE 1

| physical properties | example 1 | example 2 | example 3 | example 4 | example 5 |
|---|---|---|---|---|---|
| pencil hardness | 4H | 4H | 4H | 4H | 4H |
| fingerprint removability | good | good | good | good | good |
| scribbling resistance (times) | 50 | 40 | >100 | 50 | >100 |

| physical properties | example 6 | example 7 | comparative example 1 | comparative example 2 |
|---|---|---|---|---|
| pencil hardness | 4H | 4H | 4H | 2H |
| fingerprint removability | good | good | bad | good |
| scribbling resistance (times) | >100 | >100 | — | 20 |

The invention claimed is:

1. A coating composition comprising:
   a binder containing a UV-curable functional group;
   a compound containing a fluorine UV-curable functional group;
   a photoinitiator; and
   nano-sized particles,
   wherein the compound containing the fluorine UV-curable functional group comprises a compound that is Formula 2:

[Formula 2]

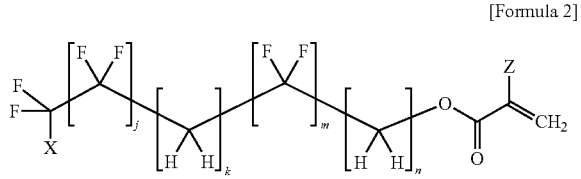

wherein X is F or $CF_3$, Z is H or $CH_3$, j and m are each an integer in the range of 1 to 16, k and n are each an integer in the range of 0 to 5.

2. The coating composition as set forth in claim 1, wherein on the basis of 100 parts by weight of the binder containing the UV-curable functional group, the content of the compound containing the fluorine UV-curable functional group is in the range of 0.5~20 parts by weight, the content of the nano-sized particles is in the range of 0.5~50 parts by weight, and the content of the photoinitiator is in the range of 1~20 parts by weight.

3. The coating composition as set forth in claim 1, wherein the binder containing the UV-curable functional group comprises multi-functional or mono-functional monomers or oligomers of acrylates, methacrylates, or vinyls.

4. The coating composition as set forth in claim 1, wherein the average particle diameter of the nano-sized particles is in the range of 0.5~50 nm.

5. The coating composition as set forth in claim 1, wherein the nano-sized particles are selected from the group consisting of silica, alumina, titania, zirconia and magnesium fluoride.

6. The coating composition as set forth in claim 1, wherein the nano-sized particles are subjected to surface treatment by using a material that is selected from the group consisting of a silane coupling agent, an epoxy compound, a hydroxyl group-containing compound and an isocyanate compound.

7. The coating composition as set forth in claim 1, further comprising:
   a solvent.

8. A coating film that is formed by using the coating composition according to claim 1, comprising:
   a binder containing a UV-curable functional group;
   a compound containing a fluorine UV-curable functional group;
   a photoinitiator; and
   nano-sized particles.

9. The coating film as set forth in claim 8, wherein the thickness of the film is in the range of 0.5~300 μm.

10. The coating film as set forth in claim 8, wherein a substrate is provided on a side of the coating film.

11. A method for producing a coating film, wherein the method comprises the steps of:
    coating the coating composition according to claim 1 on a substrate;
    drying the coated coating composition; and
    photocuring the coated coating composition.

12. The method for producing a coating film as set forth in claim 11, wherein the substrate is made of a material that is selected from the group consisting of polyester, triacetyl cellulose, an olefin copolymer and polymethyl methacrylate.

13. The method for producing a coating film as set forth in claim 11, wherein the thickness is in the range of 0.5~300 μm while the coating is performed.

14. The method for producing a coating film as set forth in claim 11, wherein the photocuring is performed by using irradiation of ultraviolet rays in an amount in the range of 0.05~2 $J/cm^2$.

15. A display device comprising:
    the coating film according to claim 8.

16. The display device as set forth in claim 15, wherein the display device is selected from the group consisting of a liquid crystal display, an organic light emitting display (OLED), a plasma display and a mobile phone window.

* * * * *